United States Patent
Kondo

(10) Patent No.: US 6,973,012 B2
(45) Date of Patent: Dec. 6, 2005

(54) INFORMATION RECORDING/REPRODUCING APPARATUS FOR EDITING DATA ON A RECORDING MEDIUM

(75) Inventor: Tadashi Kondo, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 537 days.

(21) Appl. No.: 09/987,058

(22) Filed: Nov. 13, 2001

(65) Prior Publication Data

US 2002/0051408 A1 May 2, 2002

(30) Foreign Application Priority Data

Nov. 13, 2000 (JP) .............................. 2000-344607

(51) Int. Cl.<sup>7</sup> ............................................. G11B 7/085

(52) U.S. Cl. ................................ 369/30.05; 369/53.37

(58) Field of Search .......................... 369/30.05, 30.19, 369/47.12, 47.13, 53.31, 53.37, 53.44, 53.45, 369/83

(56) References Cited

U.S. PATENT DOCUMENTS

| | | | |
|---|---|---|---|
| 4,539,662 A | * | 9/1985 | Hatano et al. ............ 369/13.56 |
| 5,608,704 A | | 3/1997 | Kim |
| 5,937,136 A | * | 8/1999 | Sato ............................. 386/52 |
| 6,088,304 A | * | 7/2000 | Aramaki et al. .......... 369/30.09 |
| 6,094,693 A | * | 7/2000 | Haneda ........................ 710/36 |
| 6,574,172 B2 | * | 6/2003 | Hamada et al. ........... 369/30.36 |

FOREIGN PATENT DOCUMENTS

WO          WO 99/38166          7/1999

* cited by examiner

Primary Examiner—Paul W. Huber
(74) Attorney, Agent, or Firm—Sughrue Mion, PLLC

(57) ABSTRACT

An information recording/reproducing apparatus is capable of recording the video information on an optical disk and reproducing the video information which has been recorded on the optical disk in accordance with a play list. The apparatus includes the detecting unit which detects an unnecessary portion of the video information not to be reproduced by any play list, and the erasing unit which erases the video information with respect to the detected unnecessary segment, which has been recorded on the optical disk.

10 Claims, 13 Drawing Sheets

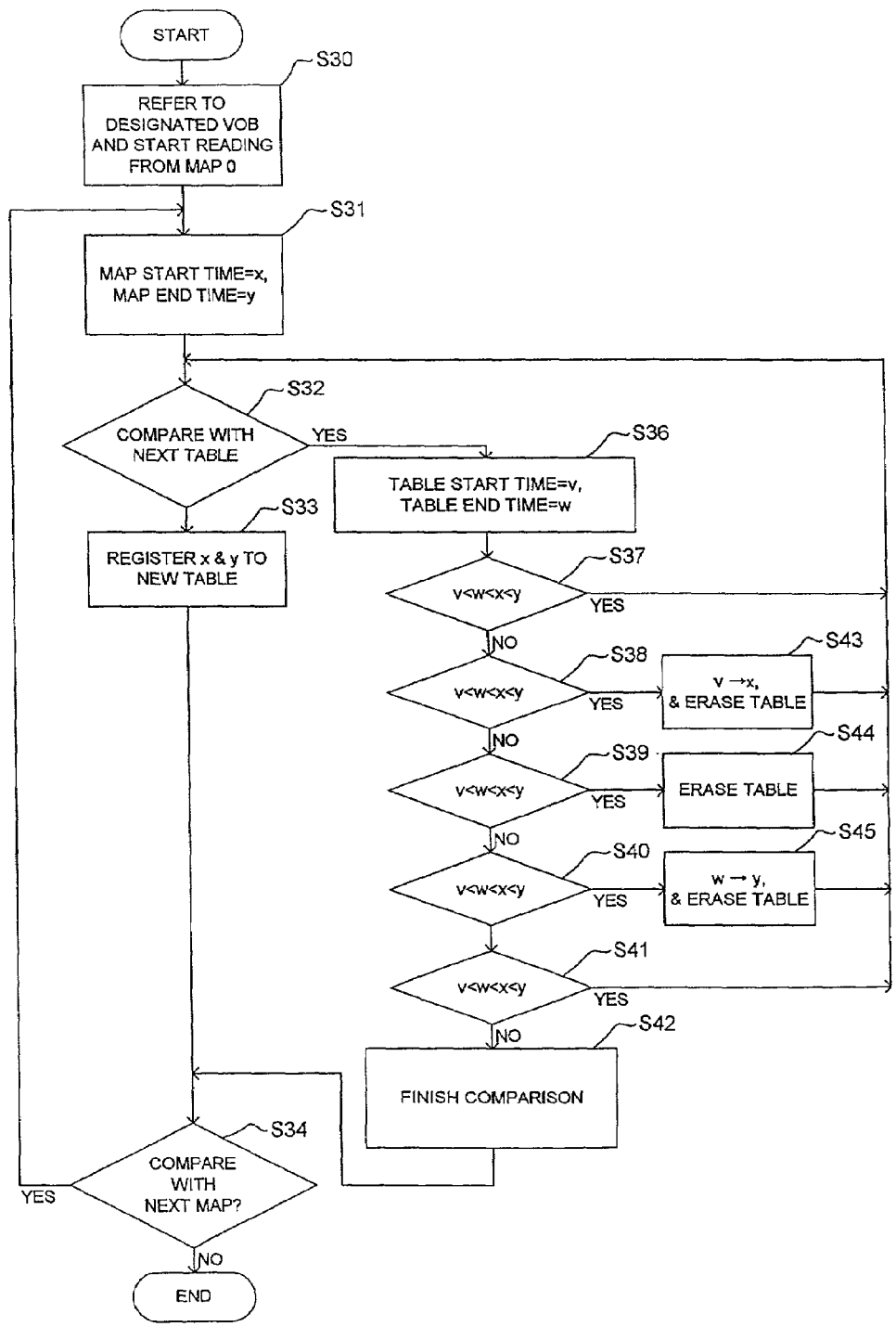

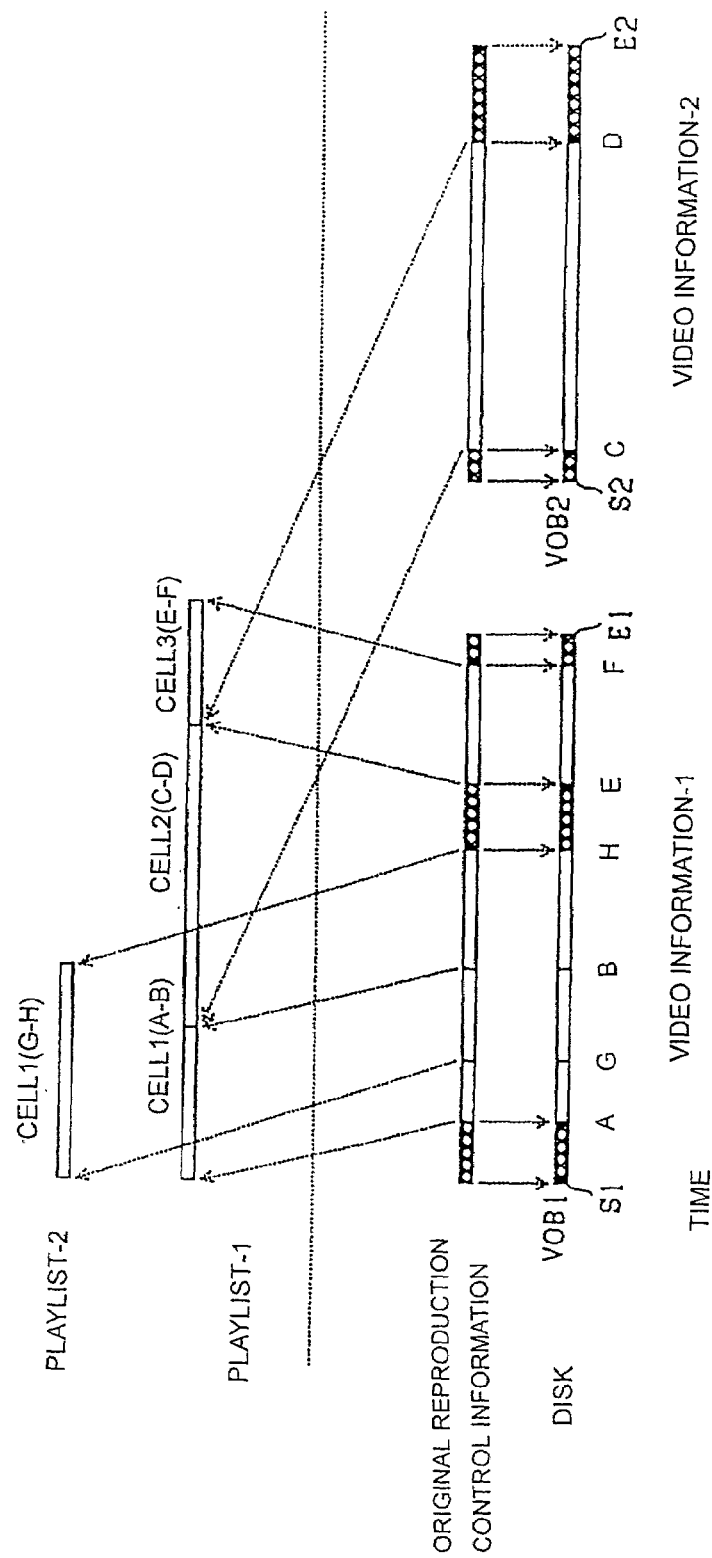

INFORMATION RECORDING/REPRODUCING APPARATUS FOR EDITING DATA ON A RECORDING MEDIUM

BACKGROUND OF THE INVENTION

1. Field of the Invention

The present invention relates to a technical art of an information recording/reproducing apparatus for recording and reproducing information on and from a recording medium. More particularly, the present invention relates to an information recording/reproducing apparatus capable of reproducing the recorded information, which has been recorded on the recording medium, in accordance with a reproducing procedure designated by a user.

2. Description of Related Art

In recent years, in accordance with development of a multi-media technology, an optical recording medium capable of recording a large quantity of digital video information and easily accessed in a random order attracts attention. As this kind of recording medium, a DVD-R (DVD Recordable) serving as a recordable optical disk capable of additionally recording information, a DVD-RW (DVD Re-recordable) and a DVD-RAM (DVD Re-writable) or the like serving as a rewritable optical disk capable of rewriting information have been put into the practical use. According to these recording media, video data is recorded after being compressed and coded by a MPEG (Moving Picture Expert Group) system which is typical system as a compression and extension system for moving picture.

It is noted that the coding technology in a MPEG system is capable of compressing moving picture information having enormous amounts of information very efficiently by applying variable-length-coding to differentiate information. More particularly, variable-length-coding differentiates between pictures, which a user desires to code and a reference picture, which is present prior to the picture in time. It also differentiates between moving vectors in units of a macro block.

A recording/reproducing apparatus for the use of these recording media generates original reproduction control information for reproducing the recorded information in an order that the recording information have been recorded on the recording medium, and records the original reproduction control information on the recording medium. Then, the recording/reproducing apparatus reproduces the recorded information on the basis of this original reproduction control information in an order that the recording information have been recorded on the recording medium. In addition, this recording/reproducing apparatus can generate user-defined reproducing information (called "play list") for reproducing the recorded information in accordance with the reproducing procedure designated by the user, and records it on the recording medium. Further, this recording/reproducing apparatus is capable of reproducing the recorded information, which have been recorded on the recording medium, in accordance with this play list. For example, a movie program broadcasted on television is once recorded, and thereafter this movie program is reproduced with unnecessary commercial film portions being skipped according to the designations by the user. By this, a play list for reproducing the movie itself, without commercial film portions, is recorded on the recording medium. Thereafter, when this play list is designated by the user, it is possible to only reproduce the movie itself without the commercial film portions.

On the other hand, in the case of increasing unrecorded area of the recording medium, in the first instance, the user tries to erase unnecessary portions of the recorded information, which is not reproduced from the recording medium by any one play lists. In such a case, according to the conventional recording/reproducing apparatus, the user has to edit the above described original reproduction control information and erase the unnecessary portions of the recorded information recorded on the recording medium.

However, such an erasing operation needs a lot of time and efforts. Additionally, particularly if a plurality of play lists are set, it is very difficult for the user to find out the unnecessary portion that is not reproduced by any one of the plural play lists. Therefore, this involves a problem such that the user erases a portion of the recording information to be reproduced on the basis of the play list by mistake or the unnecessary portion, which is not reproduced by any play list, cannot be appropriately erased.

SUMMARY OF THE INVENTION

The present invention has been made taking the foregoing problems into consideration, and its object is to provide an information recording/reproducing apparatus capable of accurately and quickly erasing the recorded information that is not reproduced from the recording medium in accordance with the reproducing procedure designated by the user.

According to one aspect of the present invention, there is provided an information recording/reproducing apparatus for recording information on a recording medium and for reproducing recorded information from the recording medium in accordance with a reproducing procedure designated by a user, including: a detecting unit for detecting an unnecessary portion of the recorded information which is not to be reproduced according to any one the reproducing procedure; and an erasing unit for erasing the recorded information corresponding to the unnecessary portion.

In accordance with the information recording/reproducing apparatus, user can record information on a recording medium. In addition, the user can create the reproducing procedure of the recorded information and records it on the recording medium. At an appropriate time, the detecting unit detects the unnecessary portion of the recorded information of the recorded information, which is not to be reproduced according to any one the reproducing procedure, and the erasing unit erases the recorded information corresponding to the unnecessary portion. Thus, the recorded information which is not to be reproduced may be erased, and the storage capacity of the recording medium can be efficiently used.

Preferably, the detecting unit may include a first unit for detecting necessary portion of the recorded information which is to be reproduced by the reproducing procedure for all of the reproducing procedure; and a second unit for determining the portion of the recorded information other than the necessary portion detected by the first unit as the unnecessary portion.

In an embodiment, the apparatus may further include a control unit for controlling the detecting unit and the erasing unit to operate when the user finishes editing the reproducing procedure.

In another embodiment, the apparatus may further include a control unit for controlling the detecting unit and the erasing unit to operate when an instruction to erase the unnecessary portion is inputted by the user.

In still another embodiment, the apparatus may further include a control unit for controlling the detecting unit and the erasing unit to operate when an instruction to eject the recording medium from the apparatus is inputted by the user.

According to another aspect of the present invention, there is provided a computer readable information recording medium storing a control program readable by a computer apparatus and making the computer apparatus to function as an information recording/reproducing apparatus for recording information on a recording medium and for reproducing recorded information from the recording medium in accordance with a reproducing procedure designated by a user, including: detecting unit for detecting an unnecessary portion of the recorded information which is not to be reproduced according to any one the reproducing procedure; and an erasing unit for erasing the recorded information corresponding to the unnecessary portion.

In accordance with the information recording medium, by executing the computer program by the computer apparatus, for example, a terminal device or a personal computer, the computer apparatus may function as the information recording/reproducing apparatus described above.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 10 is a flow chart showing a table producing operational program;

FIG. 12 is a diagram showing unnecessary portions of the original reproduction control information.

DETAILED DESCRIPTION OF THE INVENTION

Figure 1:
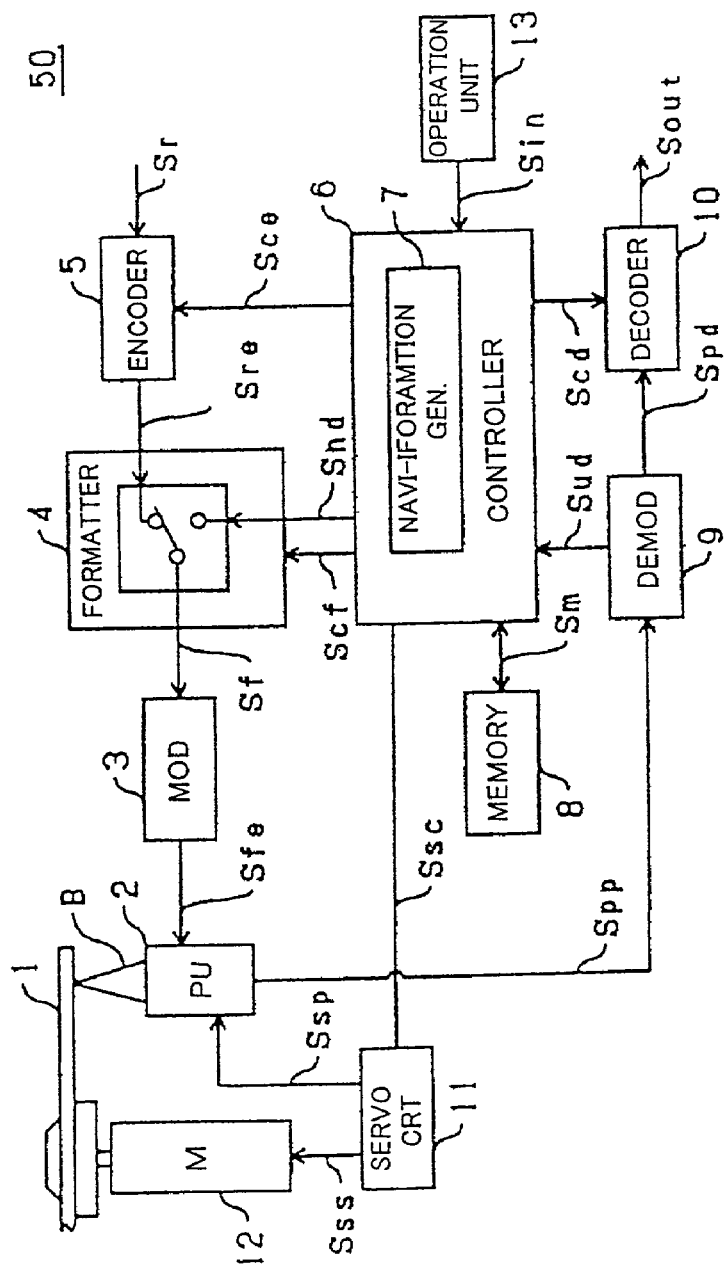
FIG. 1 is a block diagram of an information recording/reproducing apparatus according to the present invention.
Figure 2:
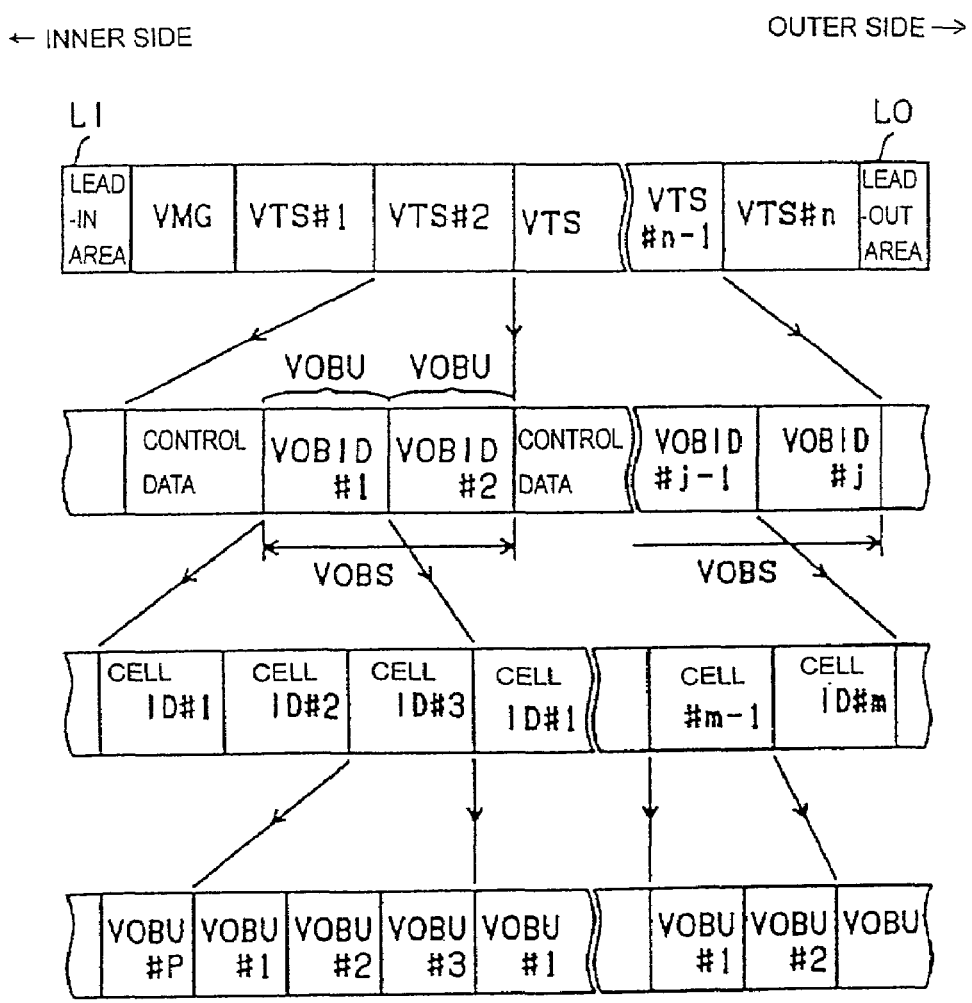
FIG. 2 is a diagram showing a recording format.
Figure 3:
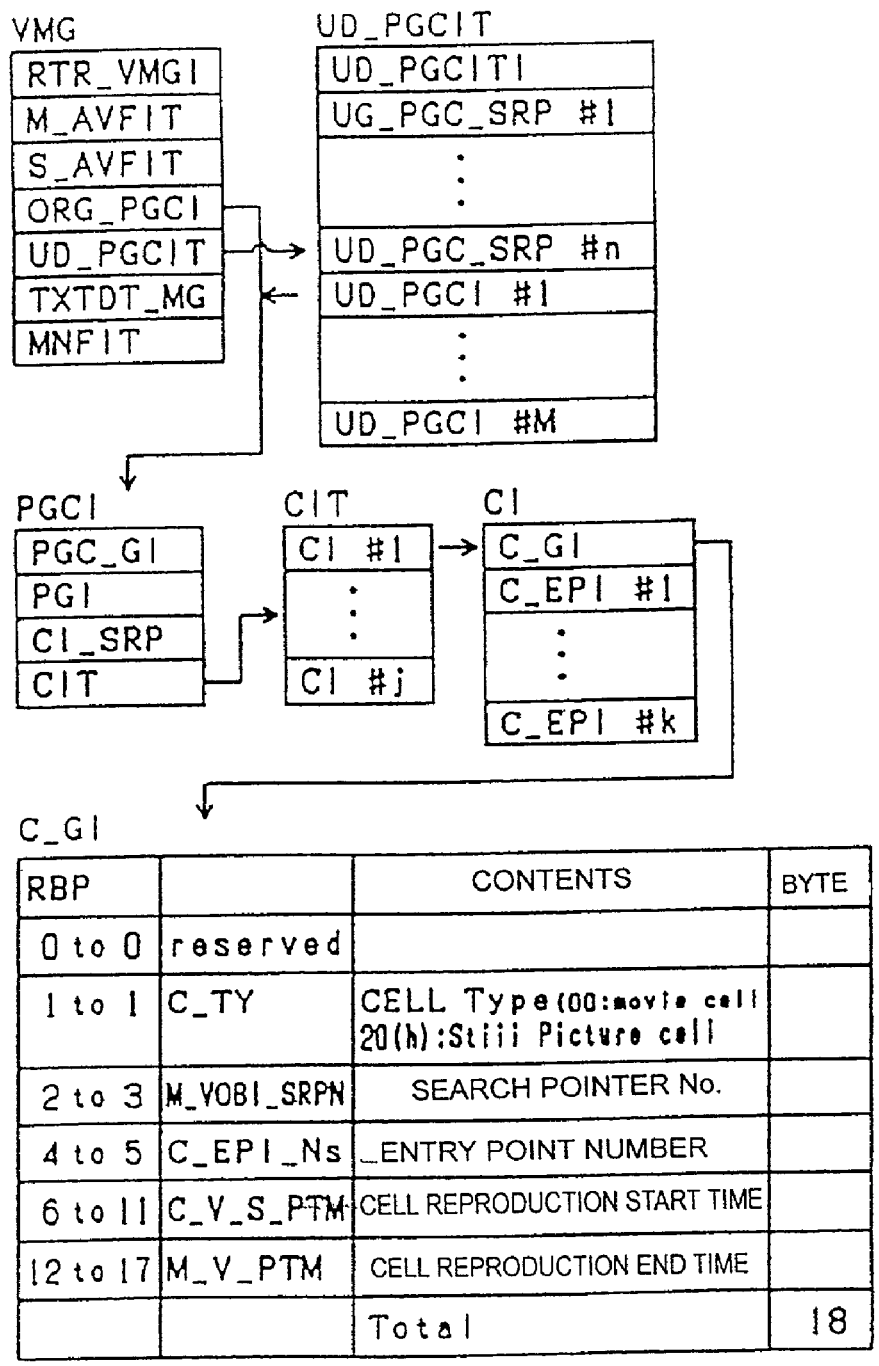
FIG. 3 is a diagram showing a hierarchical constitution of a video manager.

A preferred embodiment according to the present invention will be described below. In the embodiment described below, a recording/reproducing apparatus 50 capable of recording and reproducing video information (including the audio information) by the use of a DVD-RW (hereinafter referred to as an optical disk 1) will be explained. FIG. 1 is a block diagram showing a substantial part of the information recording/reproducing apparatus 50 according to the present invention, FIG. 2 is a diagram showing a recording format (a physical recording format) of an optical disk 1 which is used by the information recording/reproducing apparatus 50, and FIG. 3 is a diagram showing a hierarchical constitution of a video manager (VMG) in the recording format shown in FIG. 2.

At first, a recording format of an optical disk 1 to be used by the information recording/reproducing apparatus 50 will be explained with reference to FIG. 2.

The optical disk 1 has a lead-in area LI at its innermost periphery, and has a lead-out area LO at its outermost periphery. The video information is divided into a plurality of video title sets (VTS#1 to VTS#n) having ID (identification) numbers, respectively, between the lead-in area LI and the lead-out area LO. In this case, the VTS is a set of associated titles having the same attributes such as audio, the same number of streams of a sub-picture, the same specification and the same correspondence language or the like (i.e., a piece which a producer of the movie or the like is planning to serve to an audience). More specifically, for example, it is possible to record the titles having different languages for the same one movie, and further it is possible to record a theater version and a special version of the same movie as different titles, respectively.

Also, between the lead-in area LI and the lead-out area LO, the video manager (VMG) is recorded. In FIG. 2, the VMG is placed in front of the VTS#1. However, the VMG is not always placed in front of the VTS#1 depending on a file system. For example, the information recorded in the VMG includes the information in association with the entirety of the video information and the audio information to be recorded in the present optical disk 1 such as a menu indicating names of respective titles, the information for preventing the illegal copy or an access table for accessing respective titles or the like. The user-defined reproduction control information in association with the reproducing procedure according to the present invention is recorded in the VMG.

In the VTS, a plurality of video objects (VOB) having the ID numbers, respectively, are recorded with the control data at its head portion. In this case, a portion, which is configured by a plurality of VOB, is referred to as an object set (VOBS). In order to differentiate the control data from other data, which constitutes the VTS and a plurality of VOB as a substance of the video information and the audio information, the present substantial portion is defined as the VOBS. In the control data which has been recorded in a head of the VOB, the information such as program chain information (PGCI) or the like in association with a program chain serving as a logical segment including a combination of a plurality of cells is recorded. In respective VOB, the substantial portion of the video information and the music information (the picture or the sound itself in addition to the control information) are recorded in addition to the control information. Further, the VOB is structured by a plurality of cells having the ID numbers, respectively.

The cells are structured by a plurality of video object units (VOBU) having the ID numbers, respectively. In this case, the VOBU includes the information unit including the video information and the sub-picture information (i.e., the information of a sub-picture of a caption or the like in the movie), respectively. One VOB unit is constituted by a video pack (V_PCK) having the video information, an audio pack (A_PCK) having the audio information and a sub-picture pack (SP_PCK) having the sub-picture information. The video data included in the VOBU is constituted by one or more GOP.

As shown in FIG. 3, the above described VMG includes real time recording video manager information (RTR_VMGI), a movie AV file information table (M_AVFIT), a still picture AV file information table (S_AVFIT), original program chain information (ORG_PGCI), a user-defined program chain information table (UD_PGCIT), a text data manager (TXTDT_MG) and a manufacture information table (MNFIT).

Further, the above-described ORG_PGCI includes a cell information table (CIT), and this CIT includes a plurality of cell information (CI#1 to CI#j). Each CI includes the cell general information (C_GI) and a plurality of the cell entry information (C_EPI#1 to C_EPI#k). A start time and an end time of respective cells of the original reproduction control information according to the present invention are recorded in this C_GI. The above described UD_PGCIT includes a plurality of user-defined program chain information (UD_PGCI) as same as the ORG_PGCI. A start time and an end time of respective cells of the user-defined reproduction control information according to the present invention are recorded in the C_GI, which is provided below the UD_PGCI.

Next, the constitution and the schematic operation of the information recording/reproducing apparatus 50 will be explained with reference to FIG. 1. The information recording/reproducing apparatus 50 is constituted by a pickup 2, a modulation unit 3, a formatter 4, an encoder 5, a controller 6 provided with a navigation information generating unit 7, a memory 8, a demodulation unit 9, a decoder 10, a servo circuit 11, a spindle motor 12 and an operational unit 13 or the like.

The spindle motor 12 rotationally drives the optical disk 1 at a predetermined linear speed on the basis of a spindle control signal Sss from the servo circuit 11. On the other hand, the video information Sr to be recorded on the optical disk 1 is inputted to the encoder 5 from outside. The encoder 5 applies the predetermined coding processing (specifically, the compression coding processing according to a MPEG system or the like) to the video information Sr on the basis of a control signal Sce from the controller 6 to output a coding signal Sre to the formatter 4.

The formatter 4 converts the format of the video information Sr on the basis of a control signal Scf from the controller 6 so that the format of the video information Sr has the physical format shown in FIG. 2, and then the formatter 4 supplies the formatted signal Sf to the modulation unit 3. The formatter 4 converts the format of a navigation information signal Snd from the navigation information generating unit 7 to be described later so that the format of the navigation information signal Snd has the physical format shown in FIG. 2, and then the formatter 4 supplies the formated signal Sf to the modulation unit 3. The modulation unit 3 performs the predetermined modulating processing (specifically, the error correction, the interleaving, the scramble processing and the 8–10 modulation or the like) to the formatted signal Sf and outputs a modulation signal Sfe to the pickup 2. The navigation information generating unit 7 generates the information to be recorded in the above described VMG and generates the original reproduction control information and the user-defined reproduction control information according to the present invention.

The pick up 2 drives a light source such as a semiconductor laser or the like (not shown) in the pickup 2 on the basis of the modulation signal Sfe outputted from the modulation unit 3, generates an optical beam such as a laser beam or the like, irradiates the generated optical beam to a surface for recording the information and forms phase-change pits corresponding to the present modulation signal Sfe, so that the pickup 2 records the video information Sre and the navigation information signal Snd on the optical disk 1. In this case, the optical disk 1 is rotated at a predetermined linear speed by the spindle motor 12 driven on the basis of the spindle control signal Sss.

On the other hand, in the case of reproducing the video information which has already been recorded on the optical disk 1, the pickup 2 irradiates an optical beam B for reproducing the video information with a predetermined density on the optical disk 1, and then the pickup 2 outputs a detecting signal Spp, which is generated in association with the video information on the basis of the reflected light, to the demodulation unit 9. The demodulation unit 9 applies the predetermined demodulation processing to the detecting signal Spp and outputs the navigation information signal Sud to the controller 6 and a demodulating signal Spd in association with the video information to the decoder 10. The decoder 10 applies the decoding processing to the demodulating signal Spd on the basis of the control signal Scd from the controller 6 and outputs the decoded demodulating signal Spd to an external appliance (not illustrated) such as a TV monitor or the like as an output signal Sout.

Figure 4:
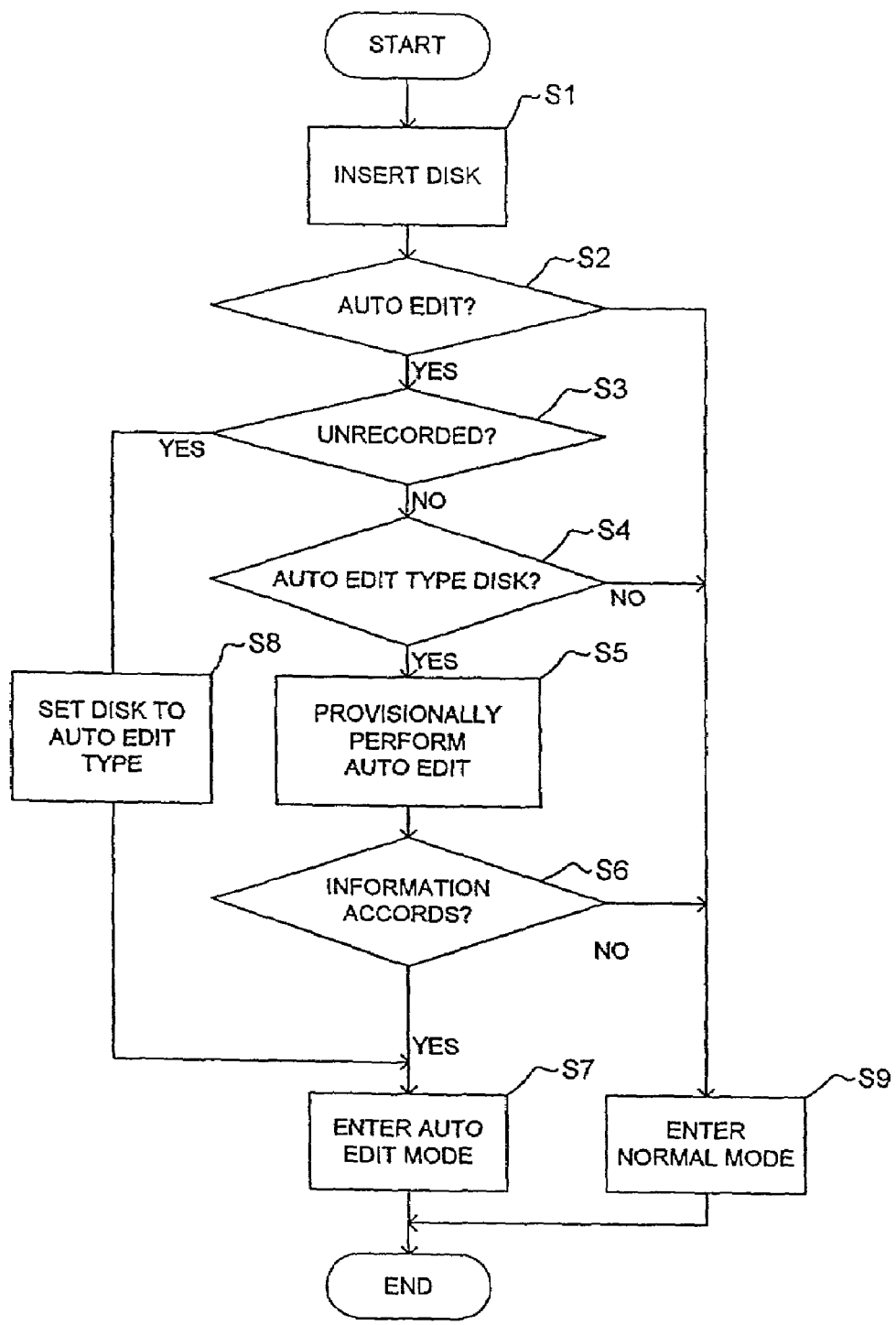
FIG. 4 is a flow chart of an operation for setting an automatic edit mode.

Next, the operation for setting an automatic edit mode by the information recording/reproducing apparatus 50 will be explained with reference to the flow chart shown in FIG. 4.

The information recording/reproducing apparatus 50 according to the present embodiment has an automatic edit mode function to erase an unnecessary portion of the video information, which is not used in any one of the plural play lists. In order to prevent the automatic edit mode from being applied to the optical disk 1, which has been recorded or edited by other apparatus, a flag indicating whether or not the automatic edit mode should be allowed is recorded, in advance, on the optical disk 1 to which the automatic edit mode is applied.

At first, when the optical disk 1 is set on a turn table in step S1, the controller 6 starts various serve control and prepares recording or reproduction with respect to the optical disk 1. Then, the controller 6 determines whether or not the automatic selection in the automatic edit mode is set by the user in step S2. In the case that the automatic edit mode is not set (step S2; NO), after the mode is changed to a normal mode such that the original reproduction control information is not automatically edited in the step S9, the control on the basis of the present operational flow is terminated. On the other hand, in the case that the automatic selection is set, the controller 6 determines whether the present optical disk 1 includes an optical disk 1 in which the information has not been recorded yet in the step S3. Such a decision is carried out by checking whether the data recorded in the VMG can be read or by trying to reproduce the VMG of the optical disk 1. If the data in the VMG cannot be read out, this optical disk 1 is determined as an unrecorded optical disk in which the information has not been recorded yet.

In the case that the optical disk 1 is an unrecorded optical disk (step S3: YES), the controller 6 records a flag which allows the automatic edit mode in the step S8 in a blank area of the VMG of the optical disk 1. Then, the control based on the present operation flow is terminated. On the other hand, in the case that the optical disk 1 is a recorded disk on which the information has been recorded (step S3: NO), the controller 6 determines whether or not the optical disk 1 is an optical disk with its mode being set to the automatic edit mode in the step S4. This decision is carried out by observing whether the flag recorded in the above described VMG is set or not.

In the case that the optical disk 1 is an optical disk which mode is set to the automatic edit mode (step S4: NO), after changing a mode into a normal mode in the step S9, the controller 6 terminates the control based on the present operational flow. On the other hand, in the case that the optical disk 1 is an optical disk which mode has been set to the automatic edit mode (step S4: YES), after provisionally performing the automatic edit processing in the step S5, the controller 6 confirms in the step S7 whether the original reproduction control information recorded in the optical disk 1 accords with the original reproduction control information automatically edited in the step S5. If the original reproduction control information recorded on the optical disk 1 does not accord with the original reproduction control information automatically edited in the step S5 (step S6: NO), it is decided that the original reproduction control information recorded in the optical disk 1 is edited by other recording/reproducing apparatus. Then, after changing the mode into the normal mode in the step S9, the controller 6 terminates the control based on the present operational flow. On the other hand, in the case that the original reproduction control information recorded in the optical disk 1 accords with the original reproduction control information automatically edited in the step S5 (step S6: YES), the controller 6 changes the mode into the automatic edit mode and terminates the control based on the present operational flow.

Figure 5:
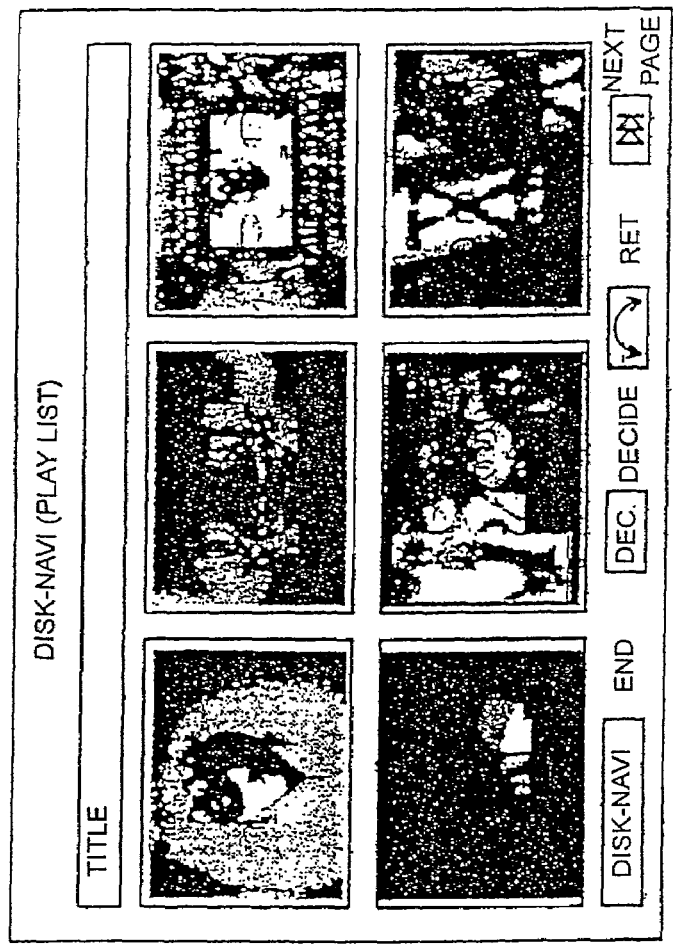
FIG. 5 is a diagram showing an example of play list screen.
Figure 6:
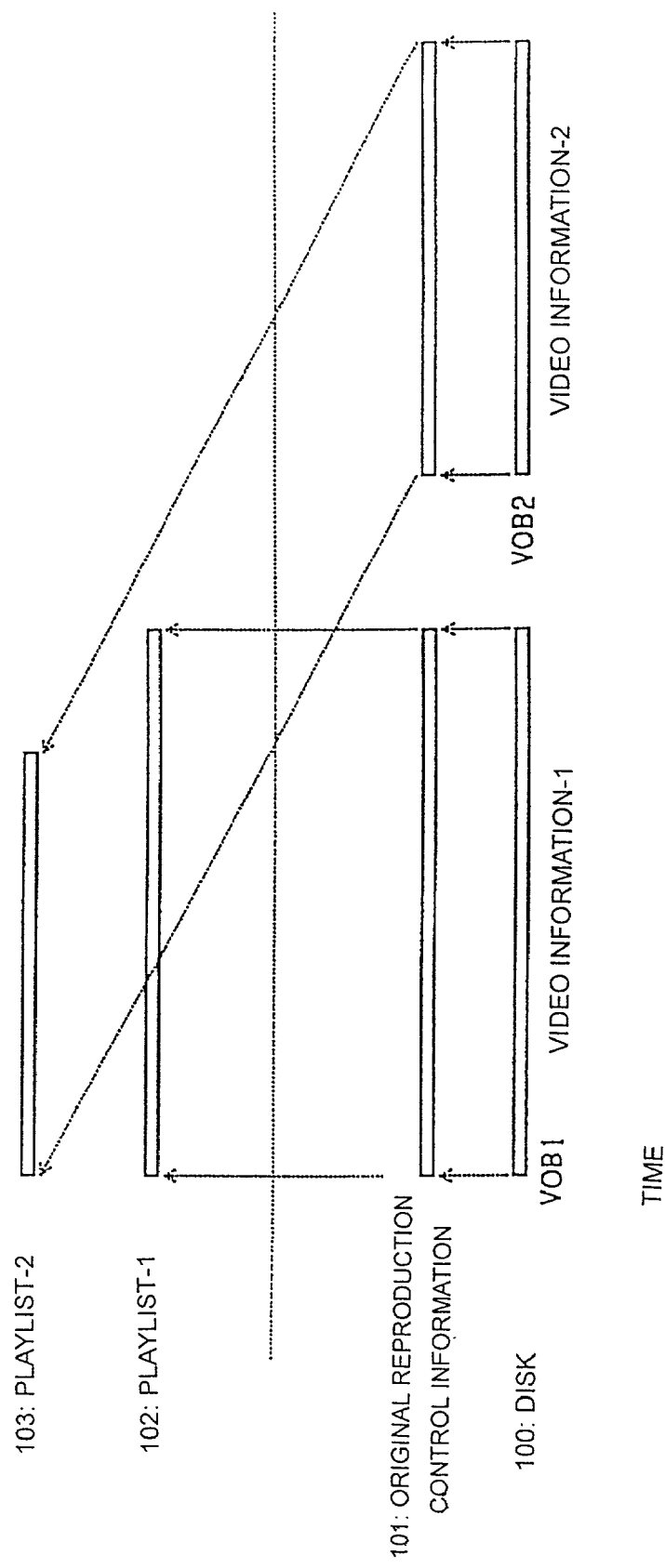
FIG. 6 is a diagram schematically showing a relationship between video information and play list.

Next, the recording operation of the video information by the information recording/reproducing apparatus 50 will be explained with reference to FIG. 5 and FIG. 6. FIG. 5 is a diagram showing a play list screen referred to as disk navigation. FIG. 6 is a diagram schematically showing a relationship between the video information recorded on the optical disk 1 and the play list. In FIG. 6, the reference numeral 100 schematically shows the recording positions of the video information-1 and the video information-2, which are recorded in the optical disk 1. The reference numeral 100 shows the time length of the video information in a bar. The reference numeral 101 shows the original reproduction control information, which indicates a start time and an end time of the video information-1 and the video information-2. The reference numeral 102 shows a state that the user performs the recording operation of the video information and the user registers the user-defined reproduction control information indicating that the start time and the end time of the video information-1 in the play list-1 1. In the same way, the reference numeral 103 shows a state that the user registers the user-defined reproduction control information indicating that the start time and the end time of the video information-2 in the play list-2.

The information recording/reproducing apparatus 50 is capable of outputting a play list screen referred to as a "disk navigation", since it makes the detection of the video information recorded in the optical disk 1 and the selection upon editing easier. The play list screen displays the video information recorded on the optical disk 1 by six still pictures on one screen as shown in FIG. 5. The six still pictures are the title pictures of the respective play lists. If the user performs the recording operation of the video information, the information recording/reproducing apparatus 50 stores a first picture of this video information in the play list screen as a still picture. In the case that the user performs the title register operation, the user registers the titles with linking (i.e., associated) the titles to the above described still picture.

If the user performs the recording operation of, for example, the video information-1, the information recording/reproducing apparatus 50 records the video information-1 in the VTS of the optical disk 1. Then, after recording the video information-1 in the VTS of the optical disk 1, the navigation information generating unit 7 generates the original reproduction control information (ORG_PGCI) indicating the start time and the end time of the video information-1 and the user-defined reproduction control information (UD_PGCI #1) indicating the start time and the end time of the video information-1 to record them in the VMG. Additionally, the navigation information generating unit 7 registers the first picture of the video information-1 in a play list-1 of the play list screen.

In the same way, the information recording/reproducing apparatus 50 records the video information-2 in the VTS of the optical disk 1 when the user performs the recording operation of the video information-2. After the recording, the information recording/reproducing apparatus 50 adds the information indicating the start time and the end time of the video information-2 to the original reproduction control information (ORG_PGCI), and the information recording/reproducing apparatus 50 generates the user-defined reproduction control information (UD_PGCI #2) indicating the start time and the end time of the video information-2 to record them in the VMG. Further, the information recording/reproducing apparatus 50 registers the first picture of the video information-2 in a play list-2 of the play list screen.

In the automatic edit mode, the information recording/reproducing apparatus 50 prohibits the edit of the original reproduction control information by the user. If the recording operation is performed, the information recording/reproducing apparatus 50 automatically produces a play list with respect to the original reproduction control information.

Figure 7:
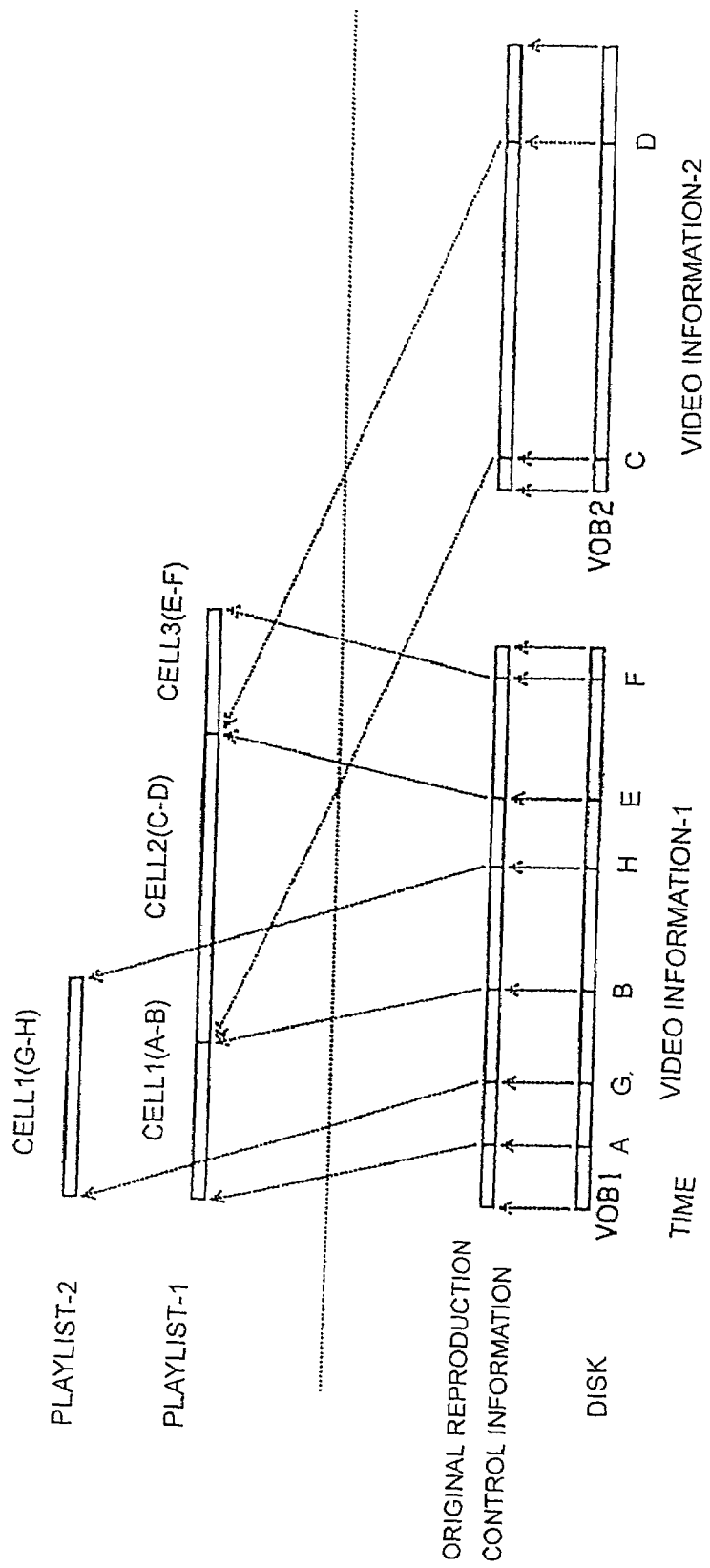
FIG. 7 is a diagram showing an example to edit the reproducing procedure by using a play list-1 and a play list-2.

Next, the edit operation by the information recording/reproducing apparatus 50 will be explained with reference to FIG. 7. FIG. 7 shows an example in which the reproducing procedure is edited by using the play list-1 and the play list-2.

If the user performs the edit operation, the information recording/reproducing apparatus 50 processes the video information of respective play lists by the unit of a plurality of cells, which are configured by the VOBU. For example, if the user selects a (A–B) segment of the video information-1 by the edit operation of the play list-1, the information recording/reproducing apparatus 50 stores a cell start time (A) and an end time (B) as a first cell information (CI#1) of a first user-defined reproduction control information (UD_PGCI #1). In FIG. 7, the stored cell start time (A) and the end time (B) as the first cell information (CI#1) of the first user-defined reproduction control information (UD_PGCI #1) are represented by a cell-1 (A–B). Additionally, in FIG. 7, the reference numerals A to H represent a time length of the video information. It is assumed that a relationship that A<G<B<H<E<F stands. For example, a relationship A<B in time is established between the start time (A) and the end time (B) of the cell 1 (A–B).

Additionally, if the user selects the (A–D) segment of the video information-2, the information recording/reproducing apparatus 50 stores a cell start time (C) and an end time (D) as a second cell information (CI#2) of a first user-defined reproduction control information (UD_PGCI #1). In FIG. 7, the stored cell start time (C) and the end time (D) as the first cell information (CI#2) of the first user-defined reproduction control information (UD_PGCI #1) are represented by a cell-2 (C–D). If the user selects the (E–F) segment of the video information-1, the information recording/reproducing apparatus 50 stores a cell start time (E) and an end time (F) as a third cell information (CI#3) of a first user-defined reproduction control information (UD_PGCI #1). In FIG. 7, the stored cell start time (E) and the end time (F) as the third cell information (CI#3) of the first user-defined reproduction control information (UD_PGCI #1) are represented by a cell-3 (E–F). Then, if the edition of the play list-1 is finished, the information recording/reproducing apparatus 50 records the first user-defined reproduction control information (UD_PGCI #1) having these first to third cell information (CI#1 to CI#3) in the VMG.

In the same way, if the user selects the (G–H) segment of the video information 1 by the edit operation of the play list-2, the information recording/reproducing apparatus 50 stores a cell start time (G) and an end time (H) as a first cell information (CI#1) of a second user-defined reproduction control information (UD_PGCI #2) in the optical disk 1. In FIG. 7, the stored cell start time (G) and the end time (H) as the first cell information (CI#1) of the second user-defined reproduction control information (UD_PGCI #2) are represented by a cell-1 (G–H). Then, if the edition of the play list-2 is finished, the information recording/reproducing apparatus 50 records the second user-defined reproduction control information (UD_PGCI #1) having the first cell information (CI#1) in the VMG.

Figure 8:
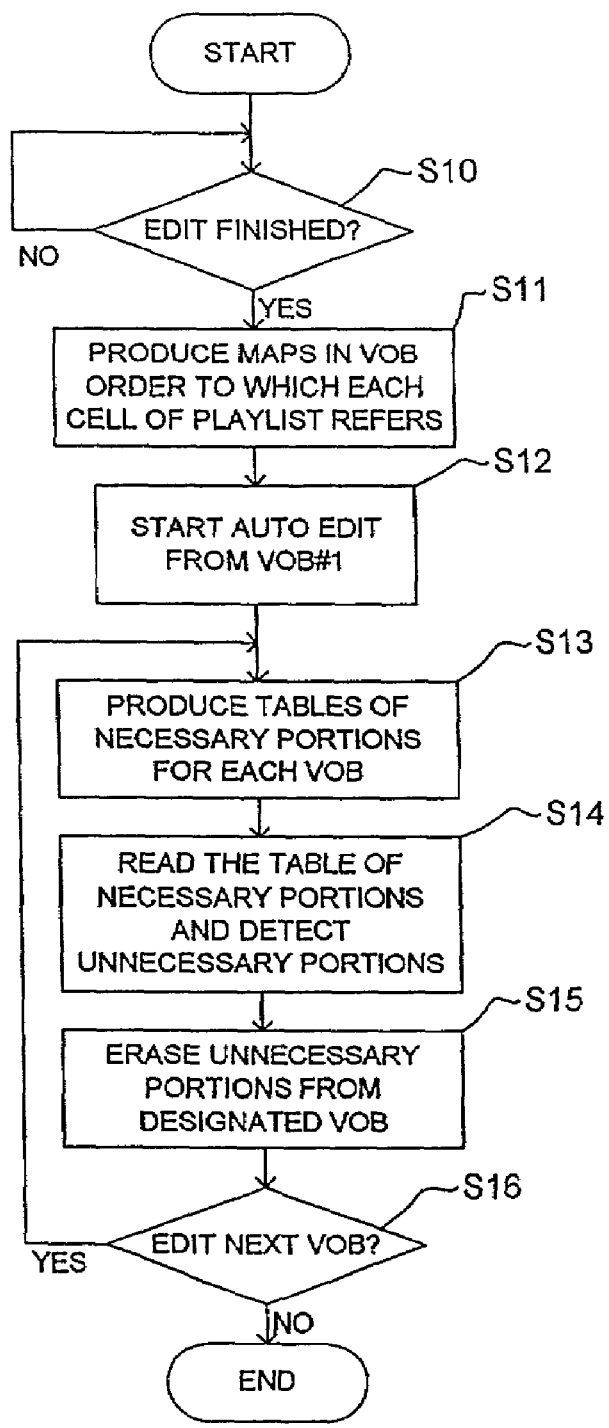
FIG. 8 is a flow chart showing an automatic edit mode operation program.
Figure 9:
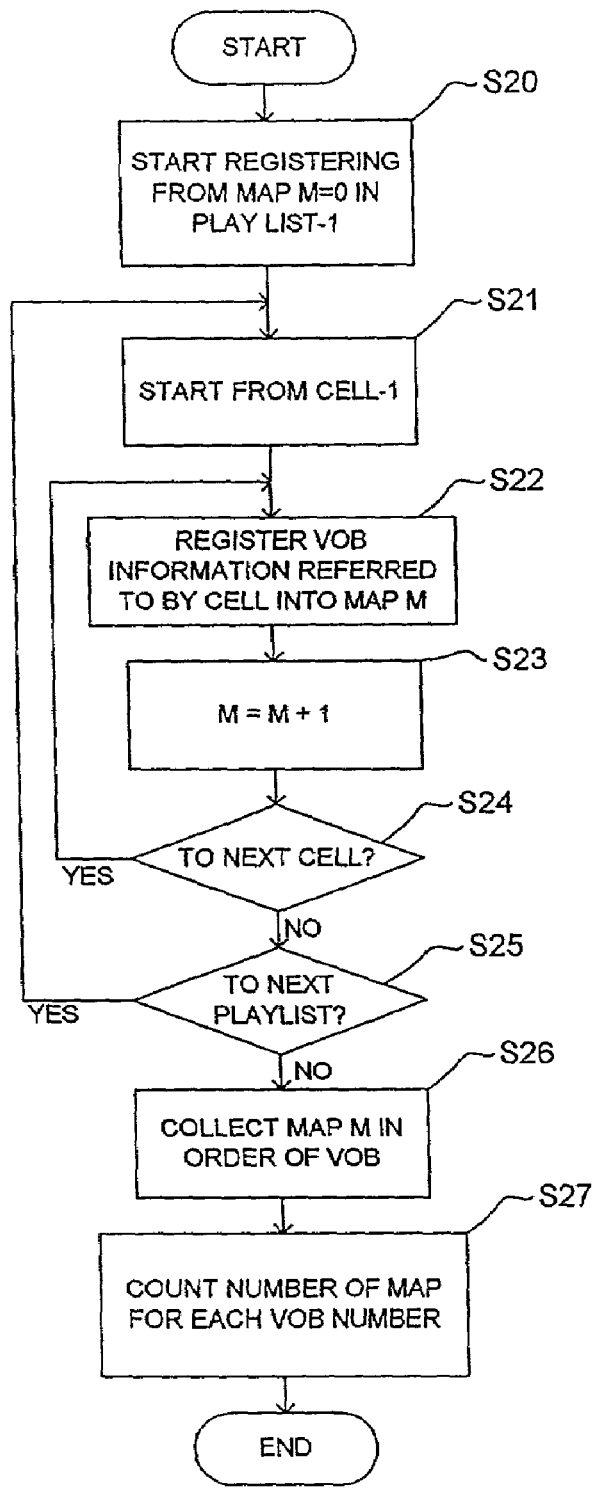
FIG. 9 is a flow chart showing a map producing operation program.

Next, the operation of the automatic edit mode of the information recording/reproducing apparatus 50 will be explained with reference to FIGS. 7 through 10. FIG. 8 is an automatic edit mode operational flowchart showing an automatic edit mode operational program of the information recording/reproducing apparatus 50, FIG. 9 is a map producing operational flowchart showing a map producing operational program to be processed upon running the automatic edit program, and FIG. 10 is a table producing operational flowchart for showing a table producing operational program to be processed upon running the automatic edit mode operational program. The map producing operational program and the table producing operational program are executed as a sub-program of the automatic edit mode operational program.

If the edit operation is finished in the automatic edit mode in the information recording/reproducing apparatus 50, the automatic edit mode operational program is executed on the basis of the automatic edit mode operational flow chart shown in FIG. 8.

At first, the controller 6 of the information recording/reproducing apparatus 50 waits for the termination of the edit operation by the user in step S10. This decision is carried out by detecting whether an edition terminating button (not illustrated) is operated by the user or not. If the edit operation is terminated (step S10: YES), the controller 6 executes the map producing operational program shown in FIG. 9 in step S11.

The controller 6 sets a value of a MAP number [M] to "0" in step S20, and starts the production of the map from the cell-1 in step S21. The controller 6 registers the information of the VOB, which is structured by the cell, in a MAP [0] in step S22.

In this case, the controller 6 registers a map having MAP [0]=(1, A, B) in the cell-1 (A–B) shown in FIG. 7, and the controller 6 goes to step S23. It is noted that a first value in parentheses indicates a VOB number. In the step S23, the controller 6 increases a value of the map number [M] by one, and the controller 6 goes to step S24. In the step S24, the controller 6 detects whether following cells exist or not. In this case, since there is a following cell-2 (step S24: YES), the controller 6 returns to the step S22.

Thereafter, the controller 6 registers the maps corresponding to respective cells constituting the play list-1 in the above described step S22 through step S24. In other words, the controller 6 registers MAP [1]=(2, C, D) and MAP [2]=(1, E, F) following MAP [0]=(1, A, B). Then, if the following cells constituting the play list-1 pass out of existence (step S24: NO), the controller 6 detects whether a next play list exists in step S25 or not. Since there is a play list-2 (step S25: YES), the controller 6 returns to the step S21 and executes respective steps in the play list-2 similarly to the play list-1 to register MAP [3]=(1, G, H).

As a result, the controller 6 registers the following maps for the play list-1 and the play list-2 shown in FIG. 7.
MAP [0]=(1, A, B)
MAP [1]=(2, C, D)
MAP [2]=(1, E, F)
MAP [3]=(1, G, H)

Then, if the following play lists pass out of existence (step S25: NO), the controller 6 goes to step S26 and sorts out the registered plural maps in an order of the VOB numbers.

In the above described case, the following results are obtained.
(FOR VOB 1)
MAP [0]=(1, A, B)
MAP [2]=(1, E, F)
MAP [3]=(1, G, H)
(FOR VOB 2)
MAP [1]=(2, C, D)

After that, the controller 6 confirms the number of the maps, which are sorted out in the order of the VOB numbers in the step S27. In this case, the number of the maps constituting the VOB 1 is "3" including MAP [0]=(1, A, B), MAP [2]=(1, E, F) and MAP [3]=(1, G, H), and the number of the maps constituting the VOB 2 is "1" including MAP [1]=(2, C, D). Thus, the controller 6 terminates the map producing operation and returns to the step S12 of the automatic edit mode operational program shown in FIG. 8.

Subsequently, the controller 6 carries out initial setting, which is necessary for carrying out the automatic edit from the VOB 1 in the step S21, and the controller 6 goes to the step S13 so as to execute the table producing operational program shown in FIG. 10.

In step S30, the controller 6 starts reading out maps from the designated VOB, namely, from the map 0 corresponding to the VOB 1. In step S31, the controller 6 defines the start time of the read out map, namely, the start time of the MAP [0] as "x" and defines the end time of the map M as "y". Then, the controller 6 compares the read out map with the table, which has been already registered, in step S32. Since there is no registered table at this point (step S32: NO), the controller 6 goes to step S33.

In step S33, the controller 6 registers the above "x" and "y" as a new table. This new table is described as a table-11 (A, B). After that, the controller 6 decides whether it should compare this table with a next map in step S34 or not. Since the next map, namely, the MAP [2] exists (step S34; YES), the controller 6 returns to the step S31.

In the step S31, the controller 6 sets the start time E of the MAP [2] to x and sets the end time F of the MAP [2] to y. Then, the controller 6 decides whether it should compare the MAP [2] with a next registered table in the step S32 or not. As described above, since the table-11 (A, B) is registered in the step S33 (step S32: YES), the controller 6 goes to step S36 in order to compare this table-11 (A, B) with the MAP [2].

In the step S36, the controller 6 sets the start time A of the table-11 (A, B), which is registered, as "v", sets the end time B to "w" and goes to step S37. Steps S37 to step S42 serve to compare the start time and the end time of the table, which has been already registered, with the start time and the end time of a map to be newly registered. This comparative processing will be described with reference to FIG. 11 below.

FIGS. 11A to 11F are diagrams showing the combinations to compare a registered table (v, w) with a new map (x, y) in time, and there are six combinations shown.

Figure 11A:
FIGS. 11A to 11F are diagrams showing manners to compare a table with a map in time.

FIG. 11A shows a state that the new map (x, y) is placed behind the registered table (v, w) in time, and this relationship is detected in the step S37. In this case, the new map (x, y) has no relationship to the registered table in time, so that the new map (x, y) is compared with a next registered table.

Figure 11B:
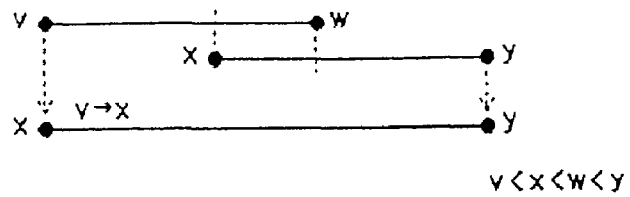

FIG. 11B shows a state that a rear part of the registered table (v, w) and a front part of the new map (x, y) are overlapped each other in time. This state is detected in step S38. In this case, in the new map (x, y), the start time v of the registered table (v, w) is assigned in this start time x and then, the new map (x, y) is compared with the next registered table. Additionally, since the registered table (v, w) is taken into the new map (x, y), the registered table (v, w) is erased from the table.

Figure 11C:
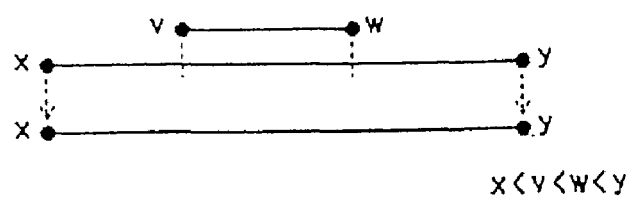

FIG. 11C shows a state that all elements of the registered table (v, w) are included in the new map (x, y), and this state is detected in step S39. In this case, the registered table (v, w) is overlapped with the new map (x, y), so that the registered table (v, w) is erased and the new map (x, y) is compared with a next registered table.

Figure 11D:
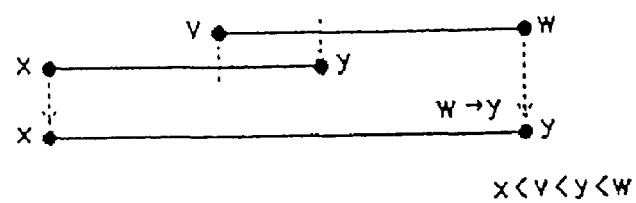

FIG. 11D shows a state that a front part of the registered table (v, w) and a rear part of the new map (x, y) are overlapped each other in time. This state is detected in step S40. In this case, in the new map (x, y), the end time w of the registered table (v, w) is assigned in the end time y, and then the new map (x, y) is compared with the next registered table. Additionally, since the registered table (v, w) is taken into the new map (x, y), the registered table (v, w) is erased from the table.

Figure 11E:
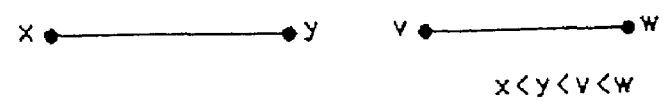

FIG. 11E shows a state that the new map (x, y) is placed in front of the registered table (v, w) in time and this state is detected in the step S41. In this case, the new map (x, y) has no relationship to the registered table in time, so that the new map (x, y) is compared with a next registered table.

Figure 11F:
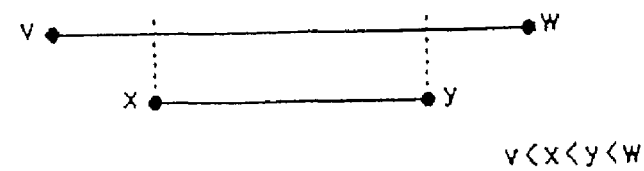

FIG. 11F shows a state that all elements of the new map (x, y) are included in the registered table (v, w) and this state is not identical with any one of the above described states. In this case, the new map (x, y) is neither compared with a next registered table and nor registered as a table.

Then, getting back to the explanation of the flowchart, the controller 6 decides the relationship between (v, w) for the registered table-11=(A, B) and (x, y) for respect to the MAP [2]=(1, E, F) belongs to which one of the above six conditions in the steps S37 to S41. As shown in FIG. 7, the relationship between (A, B) and (E, F), namely, the relationship between (v, w) and (x, y) satisfies the condition "v<w<x<y" shown in FIG. 11A (step S37: YES), so that the controller 6 goes to the step S32, and decides whether (x, y) should be compared with a next registered table or not. There is no next table (step S32: NO), so that the controller 6 registers this (x, y), namely, (E, F) as a new table-12 (E, F) in the step S33.

Therefore, there are two registered tables as follows.
Table-11 (A, B)
Table-12 (E, F)

Subsequently, the controller 6 decides whether (x, y) should be compared with a next registered table or not in the step S34. Since a next map, namely, MAP [3] exists (step S34: YES), the controller 6 returns to the step S31.

In the step S31, the controller 6 sets the start time G of MAP [3] to "x" and sets the end time H of MAP [3] to "y". Then, the controller 6 decides whether (x, y) should be compared with a next registered table or not in the step S32. There are two registered table, i.e., table-11 (A, B) and table-12 (E, F) (step S32: YES) as described above, so that at first the controller 6 returns to the step S36 so as to compare the table-11 (A, B) with MAP [3].

In step S36, the controller 6 decides which relationship among the above described relationships (v, w) for the registered table-11=(A, B) establishes with (x, y) for the MAP [3]=(1, G, H) in the steps S37 to S41, assuming that the start time A of the table-11 (A, B) is "v" and the end time B is "w". As shown in FIG. 7, the relationship between (A, B) and (G, H), namely, the relationship between (v, w) and (x, y) satisfies a condition "v<x<w<y" shown in FIG. 11B (step S38: YES), so that in step S43, the controller 6 assigns the start time v of the registered table-11 (v, w) in the start time x, erases the table-11 (v, w) and goes to the step S32.

The controller 6 decides whether (x, y) should be compared with a next registered table or not again in the step S32. A next table-12 (E, F) exists as described above (step S32: YES), so that the controller 6 decides which relationship among the above described relationships (v, w) for the registered table-12=(E, F) establishes with (x, y) which is set in the above described step S43, namely, (A, H) in the steps S37 to S41, assuming that the start time E of the table-12 (E, F) is v and the end time F thereof is w. As shown in FIG. 8, the relationship between (E, F) and (A, H), namely, the relationship between (v, w) and (x, y) satisfies a condition "x<y<v<w" shown in FIG. 11E (step S41: YES), so that the controller 6 returns to the step S32. Then, the controller 6 decides whether (x, y) should be compared with a next registered table or not again. In this case, there is no further registered table which is not compared with (x, y) (step S32: NO), so that the controller 6 registers this (x, y), namely, (E, F) as a table-13 (E, F) in the step S33.

As a result, there are two registered tables as follows. The table-11 (A, b) does not exist, since it is erased in the step S43.
Table-12 (E, F)
Table-13 (A, H)

Subsequently, the controller 6 decides whether (x, y) should be compared with a next registered table or not in the step S34. In this case, there is no further map to be compared with (step S34: NO), so that the controller 6 terminates the registration of the table in an effective segment of the designated VOB1 and returns to the step S14 shown in FIG. 8.

In the step S14, the controller 6 reads out a table with respect to the effective segment of the designated VOB1, which has been registered in advance, and calculates remaining unnecessary segments (namely, hatched portions shown in FIG. 12). According to the present embodiment, the steps S13 and S14 constitute the unnecessary segment detecting process. Then, the controller 6 edits the original reproduction control information so as to erase the unnecessary segment from the video information VOB1 in the step S15. Therefore, this step S15 constitutes the unnecessary segment erasing process according to the present invention.

Subsequently, the controller 6 decides whether it should edit a next VOB in the step S16 or not. As shown in FIG. 7, according to an example in the present embodiment, the VOB 2 still exists (step S16: YES), so that the controller 6 returns to the step S13 and repeats the above described operation. Since it has been already described above, a simple explanation will be given below. The controller 6 produces a table-11 (C, D) from the play list-2 in the step S13, reads out this table-11 in the step S14, and calculates the remaining unnecessary segment (namely, hatched portions shown in FIG. 12). Then, the controller 6 edits the original reproduction control information so as to erase the unnecessary segment from the video information VOB2 in the step S15. Further, if the controller 6 decides that there is no next VOB in the step S16 (step 16: NO), it terminates the above described automatic edit mode operational program.

The present invention is not limited to the above described embodiment. For example, according to the above described embodiment, the present invention is constituted in such a manner that, if the edit operation is finished in the automatic edit mode operation, the unnecessary video information not to be referred to by any play list is automatically erased. However, according to the present invention, an unnecessary picture erasing key may be provided to the operational unit 13 so that the user is capable of erasing the unnecessary video information by one-touch operation at arbitrary timing or this automatic erasing operation may be carried out just before the recording medium is ejected.

According to the above embodiment, the information recording/reproducing apparatus 50 includes an apparatus which records the video information in the optical disk 1, however, the information recording/reproducing apparatus 50 may be an apparatus which only records the audio information. Additionally, according to the above embodiment, a DVD-RW is used as a recording medium. However, the present invention may also be applied to other optical disk such as a DVD-RAM or the like as a matter of course and further, it may also be applied to a recording/reproducing apparatus which records and reproduces the recording information in various kinds of recording media such as a hard disk and a semiconductor memory or the like.

Figure 13:
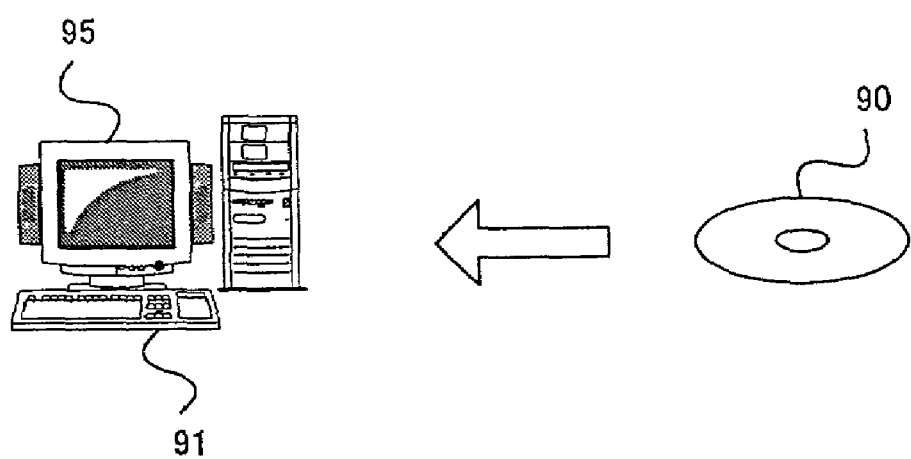
FIG. 13 is a schematic view showing an application of the present invention.

Further, as shown in FIG. 13, by recording a control program corresponding to the flowcharts shown in FIG. 4 and FIGS. 8 to 10 in a flexible disk 90 and an optical disk 90 or a hard disk 91 or the like serving as an information recording medium. By reading out this program by a personal computer 95 or the like to execute it, it is also possible to function a CPU of the computer as the above described controller 6 and function a computer provided with a disk drive such as a DVD-ROM drive apparatus or the like as the above described information recording/reproducing apparatus 50.

According to the present invention, it is possible to accurately and quickly erase, from the recording medium, the unnecessary portion of the recording information that is not to be reproduced in accordance with the play list designated by the user.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-344607 filed on Nov. 13, 2000 including the specification, claims, drawings and summary is incorporated herein by reference in its entirety.

What is claimed is:

1. An information recording/reproducing apparatus for recording information on a recording medium and for reproducing recorded information from the recording medium in accordance with a reproducing procedure designated by a user, comprising:
   a detecting unit for detecting an unnecessary area on the recording medium where an unnecessary portion of the recorded information which is not to be reproduced according to the reproducing procedure;
   an erasing unit for erasing the unnecessary area; and
   a control unit for controlling the detecting unit and the erasing unit to operate when an instruction to eject the recording medium from the apparatus is inputted by the user.

2. The apparatus according to claim 1, wherein the detecting unit comprises:
   a first unit for detecting a necessary area where a necessary portion of the recorded information which is to be reproduced by the reproducing procedure is recorded for all of the reproducing procedure; and
   a second unit for determining an area other than the necessary area detected by the first unit as the unnecessary area.

3. The apparatus according to claim 1, further comprising a control unit for controlling the detecting unit and the erasing unit to operate when the user finishes editing the reproducing procedure.

4. The apparatus according to claim 1, further comprising a control unit for controlling the detecting unit and the erasing unit to operate when an instruction to erase the unnecessary portion is inputted by the user.

5. A computer readable information recording medium storing a control program readable by a computer apparatus and making the computer apparatus to function as an information recording/reproducing apparatus for recording information on a recording medium and for reproducing recorded information from the recording medium in accordance with a reproducing procedure designated by a user, comprising:
   a detecting unit for detecting an unnecessary area on the recording medium where an unnecessary portion of the recorded information which is not to be reproduced according to the reproducing procedure is recorded;
   an erasing unit for erasing the unnecessary area; and
   wherein the information recording/reproducing apparatus further comprises, a control unit for controlling the detecting unit and the erasing unit to operate when an instruction to eject the recording medium from the apparatus is inputted by the user.

6. The recording medium according to claim 5, wherein the detecting unit comprises:
   a first unit for detecting a necessary area where a necessary portion of the recorded information which is to be reproduced by the reproducing procedure is recorded, for all of the reproducing procedure; and
   a second unit for determining the area other than the necessary area detected by the first unit as the unnecessary area.

7. The recording medium according to claim 5, wherein the information recording/reproducing apparatus further comprises, a control unit for controlling the detecting unit and the erasing unit to operate when the user finishes editing the reproducing procedure.

8. The recording medium according to claim 5, wherein the information recording/reproducing apparatus further comprises, a control unit for controlling the detecting unit and the erasing unit to operate when an instruction to erase the unnecessary portion is inputted by the user.

9. An information recording/reproducing apparatus for recording information on a recording medium and for reproducing recorded information from the recording medium in accordance with a reproducing procedure designated by a user, comprising:
- a detecting unit for detecting an unnecessary area on the recording medium where an unnecessary portion of the recorded information which is not to be reproduced according to the reproducing procedure; and
- an erasing unit for erasing the unnecessary area;
- wherein the detecting unit comprises:
  - a first unit for detecting a necessary area where a necessary portion of the recorded information which is to be reproduced by the reproducing procedure is recorded for all of the reproducing procedure; and
  - a second unit for determining an area other than the necessary area detected by the first unit as the unnecessary area;
- wherein the erasing unit leaves the positions of the necessary area and a second non-contiguous necessary area on the recording medium unchanged.

10. A computer readable information recording medium storing a control program readable by a computer apparatus and making the computer apparatus to function as an information recording/reproducing apparatus for recording information on a recording medium and for reproducing recorded information from the recording medium in accordance with a reproducing procedure designated by a user, comprising:
- a detecting unit for detecting an unnecessary area on the recording medium where an unnecessary portion of the recorded information which is not to be reproduced according to the reproducing procedure is recorded; and
- an erasing unit for erasing the unnecessary area;
- wherein the detecting unit comprises:
  - a first unit for detecting a necessary area where a necessary portion of the recorded information which is to be reproduced by the reproducing procedure is recorded, for all of the reproducing procedure; and
  - a second unit for determining the area other than the necessary area detected by the first unit as the unnecessary area;
- wherein the erasing unit leaves positions of the necessary area and a second non-contiguous necessary area on the recording medium unchanged.

* * * * *